United States Patent
Kuo

(10) Patent No.: US 9,232,186 B2
(45) Date of Patent: Jan. 5, 2016

(54) VIDEO TERMINAL DEVICE AND METHOD OF DETECTING DIRECTION OF GAZE

(71) Applicant: HON HAI PRECISION INDUSTRY CO., LTD., New Taipei (TW)

(72) Inventor: Chung-Hsuan Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/262,942

(22) Filed: Apr. 28, 2014

(65) Prior Publication Data

US 2014/0354763 A1    Dec. 4, 2014

(30) Foreign Application Priority Data

May 30, 2013  (TW) .............................. 102119143 A

(51) Int. Cl.
*H04N 7/14* (2006.01)
*H04N 7/15* (2006.01)

(52) U.S. Cl.
CPC . *H04N 7/15* (2013.01); *H04N 7/147* (2013.01)

(58) Field of Classification Search
CPC ...................................................... H04N 7/147
USPC ......................................................... 348/14.07
See application file for complete search history.

(56) References Cited

U.S. PATENT DOCUMENTS

2010/0201621 A1    8/2010    Niikawa

FOREIGN PATENT DOCUMENTS

TW         201005651 A       2/2010

*Primary Examiner* — Creighton Smith
(74) *Attorney, Agent, or Firm* — Novak Druce Connolly Bove + Quigg LLP

(57) ABSTRACT

A video terminal device includes a capture module, a detection module, a transmitting module, and a displaying module. The capture module takes images of the eyes of a user when the user is gazing at a display device to obtain three points of focus of the eyes, and confirms a circle bounding the three points of focus. The detection module detects whether an area of the applied circle is less than a first threshold. The transmitting module outputs coordinates of the center of the applied circle as an eyes direction when the area of the circle is less than the first threshold, enabling the participants in a conference to see the eyes direction of the presenter and the presenter to see the eyes directions of each of his audience.

18 Claims, 6 Drawing Sheets

Example 1

Example 2

Example 3

VIDEO TERMINAL DEVICE AND METHOD OF DETECTING DIRECTION OF GAZE

FIELD

The disclosure relates to network communications, and particularly to video terminal device and method of detecting eye direction.

BACKGROUND

When a long-distance meeting is needed, people are increasingly accustomed to using video conferencing, which can achieve good communication. However, during the video conferencing, participants may not accurately understand the meaning expressed by speakers or misjudge what is being said. For example, when a presentation needs to be shared, although each participant in any place can see content of the presentation, the speaker can only verbally indicate the location of some argument or point in the presentation, even using a laser pen may not be clear enough, so the participants will not really understand the briefing or flow of ideas expressed by the speaker.

BRIEF DESCRIPTION OF THE DRAWINGS

Many aspects of the present embodiments can be better understood with reference to the tracking drawings. The components in the drawings are not necessarily drawn to scale, the emphasis instead being placed upon clearly illustrating the principles of the present embodiments. Like reference numerals designate corresponding parts throughout the several views of the drawings.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The word "module" as used hereinafter, refers to logic embodied in hardware or firmware, or to a collection of software instructions, written in a programming language, such as, for example, JAVA, C, or assembly. One or more software instructions in the modules may be embedded in firmware such as in an EPROM. It will be appreciated that modules can comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
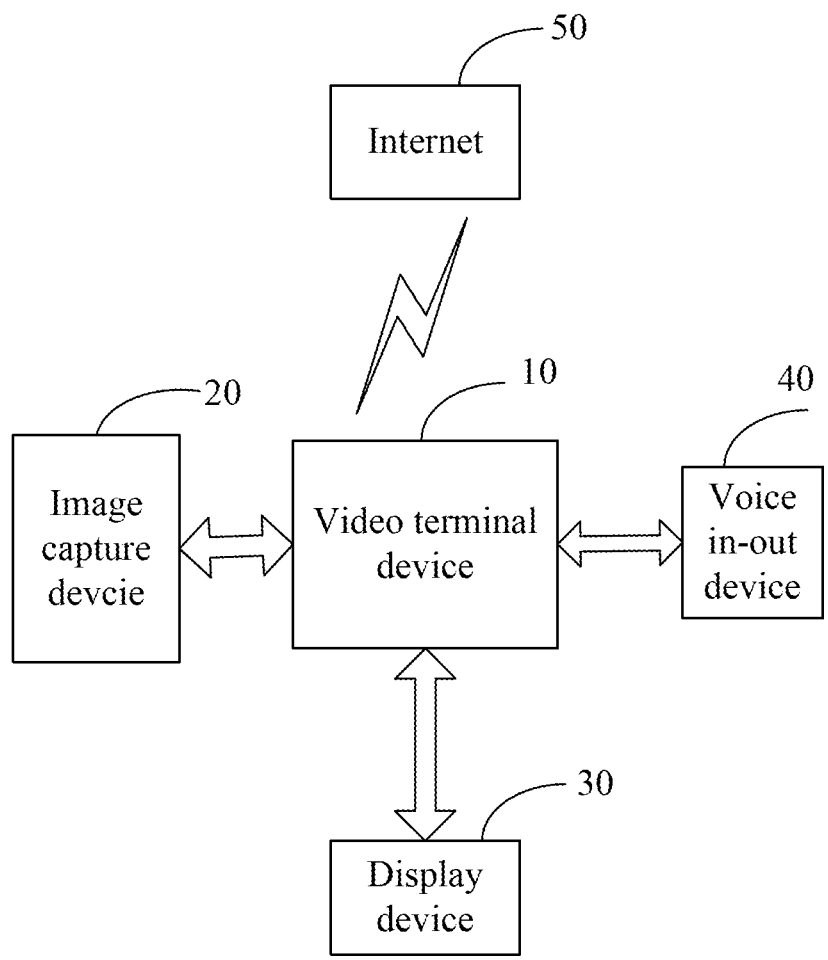
FIG. 1 is an application environment diagram of one embodiment of a video terminal device as disclosed.

FIG. 1 is an application environment diagram of one embodiment of a video terminal device 10. In at least one embodiment, the video terminal device 10 can be connected to a plurality of peripheral devices that comprises a image capture device 20, a display device 30, and a voice in-out device. The video terminal device 10 is connected to an Internet 50. The shooting device 20 and the display device 30 can handle images for video conferencing, the voice in-out device can receive or output audio. In at least one embodiment, the video terminal device 10 can capture images of human eyes to determine the directions or points where participants of the video conferencing are looking. In at least one embodiment, the peripheral devices can also be part of or be integrated with the video terminal device 10.

Figure 2:
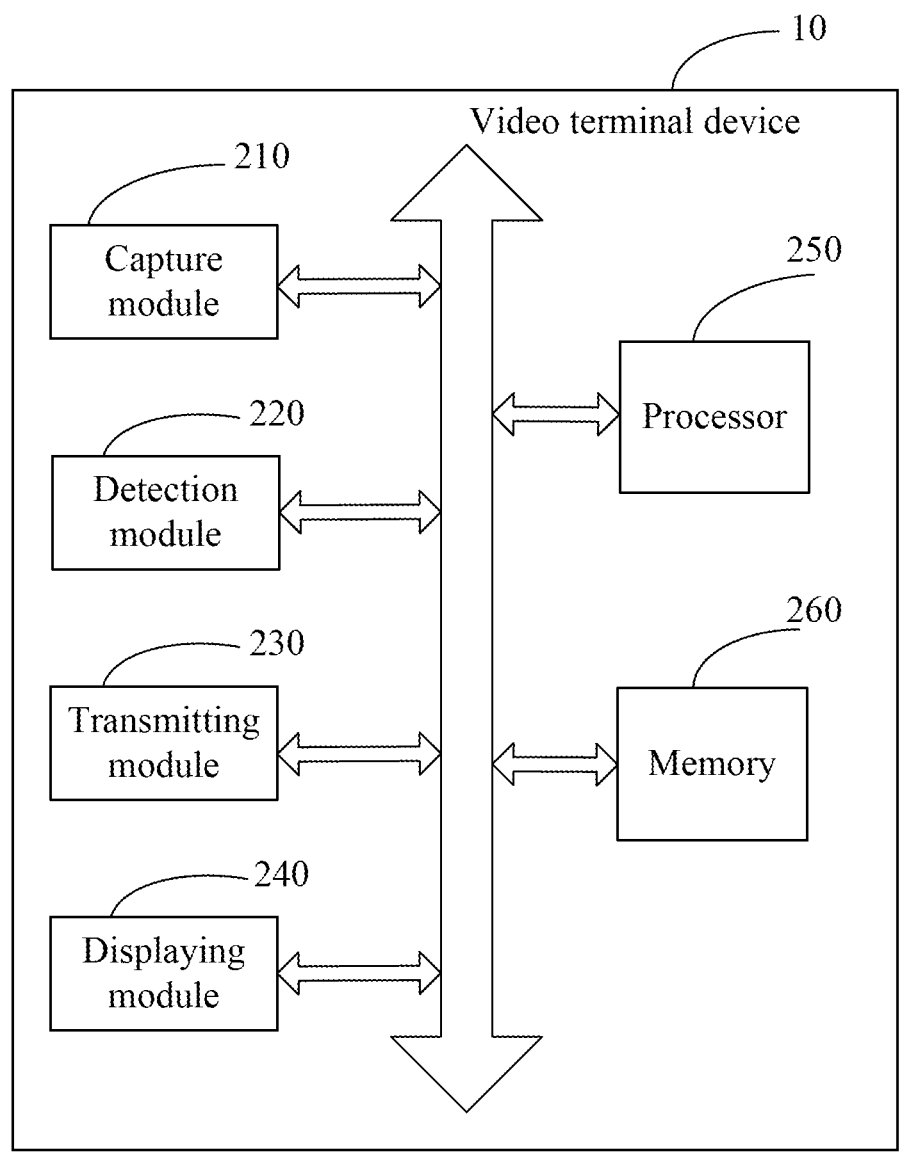
FIG. 2 is a function module diagram of one embodiment of the video terminal device of FIG. 1.

FIG. 2 is a function module diagram of one embodiment of the video terminal device 10 of FIG. 1. In at least one embodiment, the video terminal device 10 comprises a capture module 210, a detection module 220, a transmitting module 230, a displaying module 240, a storage system 250, and a processor 260. The modules 210, 220, 230, 240 comprise software programs which are stored in the storage system 250, and the processor 260 runs the software programs to achieve functions of these modules 210, 220, 230, 240.

In at least one embodiment, during the video conferencing, the function modules of the video terminal device 10 takes images of the participants to determine eye directions of the participants. In particular, an eyes direction of a speaker regarded as a first perspective is determined by the video terminal device 10, and an eyes direction coordinates that characterize the eyes direction can be shown in the display device 30. Thus, listeners can see the points or direction of the eyes of a speaker to better understand what the speaker is saying.

In at least one embodiment, when the speaker explains contents of the display device 30 (the contents of the display device 30 also can be briefing, the following the contents of the display device 30 will be replace by the briefing), some important issues need to be stated so that the speaker is gazing for a longer time at a point on the briefing, the capture module 210 then taking a image of eyes of the speaker to obtain a visual focusing point of the speaker. In order to avoid any error caused by a movement of the speaker, and also to know more exactly the eye direction of the speaker, the capture module 210 also obtains three eye focusing points (focus points) of the speaker. The three focus points of the speaker show as three points in the display device 30, the capture module 210 then confirms a circle according to the three focus points of the speaker, and a center of the circle also can be confirmed, in one embodiment, the center of the confirmed circle is regarded as the eyes direction of the speaker.

Figure 3:
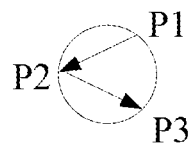
FIG. 3 is a schematic illustration of circle in different situations of capture module obtaining three visual focus positions.
Figure 3:
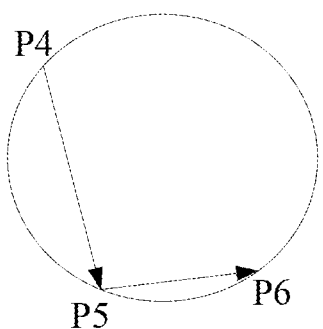
Figure 3:
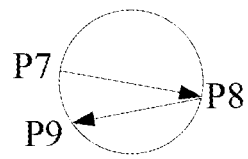

FIG. 3 is a schematic illustration of a confirmed circle in different situations. Three examples can be seen, in example 1, the three focus points are from p1 to p2, then p2 to p3, obviously an area of a circle composed by the p1, p2, and p3 is small, which indicates that the eyes direction of the speaker changes little. In example 2 and example 3, the three visual focal positions are from p4 to p5, then p5 to p6, and from p7 to p8, then p8 to p9, offsets of the points are relatively large, which indicates that the eyes direction of the speaker change much more.

Referring to FIG. 2, after the circle is confirmed according to the three visual focal positions of the speaker, the detection module 220 detects whether the area of the confirmed circle is less than a first threshold area. The first threshold area is a preset constant according to the speaker's preference, and stored in the storage system 250. When the area of the circle is less than the first threshold, the transmitting module 230 outputs the centre of the circle as the eye direction coordinate. When the area of the circle is not less than the first threshold, the capture module 210 obtains further focus points of the speaker to confirm a new circle until the area of the new circle is less than the first threshold.

For example, referring to FIG. 3, assuming that the area of the circle in example 1 is less than the first threshold, indicating that the direction of the speaker's eyes is substantially constant or close to the coordinate, in other words, the eye direction location of the speaker is the important content of the briefing, and the transmitting module 230 shows the eye direction location of the speaker in the display device 30 so that the listeners realize the importance of this content of the briefing. Assuming that the area of the circle in example 2 is not less than the first threshold, which indicates that the speaker's eyes move frequently, in other words, the present content of the briefing is not so important, the capture module 210 then obtains further three visual focal positions of the user to confirm the new circle. The example 3 is the same as example 2.

Referring again to FIG. 2, after the eye direction coordinate of the speaker is shown in the display device 30, the direction(s) of the gaze of the speaker are made known to the audience in the following manner.

The transmitting module 230 of the video terminal 10 of the present speaker outputs the eye direction coordinate of that speaker to the video terminal 10 of the listeners. The displaying module 240 of the video terminal 10 of the listeners stores the eye direction coordinate of the speaker in the storage system 250. The following modules are all part of or integrated with the video terminal 10 of each of the listeners.

In at least one embodiment, the detection module 220 detects whether the storage system 250 has stored a first previous eye direction coordinate of the presenter. If the storage system 250 has not stored the first previous eye direction coordinate of the speaker, then the eye direction coordinate of the speaker is a newest eye direction coordinate and the displaying module 240 shows the eye direction coordinate of the speaker in the display device 30. If the storage system 250 has stored the first previous eye direction coordinate of the speaker, the detection module 220 detects whether a distance between the eye direction coordinate output by the transmitting module 230 of video terminal 10 of the speaker and the first previous eye direction coordinate stored in the storage system 250 is less than a second threshold. The second threshold is preset constant according to the speaker's preference, and stored in the storage system 250. The displaying module 240 updates the first previous eye direction coordinate to the eye direction coordinate output by the transmitting module 230 of video terminal 10 of the speaker when the distance between the eye direction coordinate transmitting module 230 of video terminal 10 of the speaker and the first previous eye direction coordinate stored in the storage system 250 is not less than the second threshold.

The foregoing disclosure of the various embodiments explains how the listeners are made aware of the eye direction coordinate of the speaker, the following explains how the present speaker/presenter is made aware of the eyes directions of each of the listeners.

In at least one embodiment, when the eye direction of the speaker is a point in the display device 30, the capture module 210 obtains the three visual focal positions of the listeners to confirm a circle, then the method of the modules of the video terminal device 10 detecting eye direction of the listeners is the same as the method of the eye direction of the speaker, and thus is not stated again. However, after the video terminal device 10 of the speaker receives the eye direction coordinate of the listeners, the following method is applied.

In at least one embodiment, after the displaying module 240 of the video terminal device 10 of the speaker receives the eye direction coordinate of the listeners, the detection module 220 detects whether the distance between the eye direction coordinate output by the transmitting module 230 and a second previous eye direction coordinate is less than a third threshold. The third threshold is a preset constant according to the speaker's preference, and stored in the storage system 250. The displaying module 240 shows the eye direction coordinate output by the transmitting module 230 in the display device 30 to indicate an area at which the listeners are gazing when the distance between the eye direction coordinate output by the transmitting module 230 and the second previous eye direction coordinate is less than the third threshold. The displaying module shows the eye direction coordinate output by the transmitting module 230 in the display device to indicate the area at which listener are gazing when the distance between the eye direction coordinate output by the transmitting module 230 and the second previous eye direction coordinate is less than the third threshold.

Figure 4:
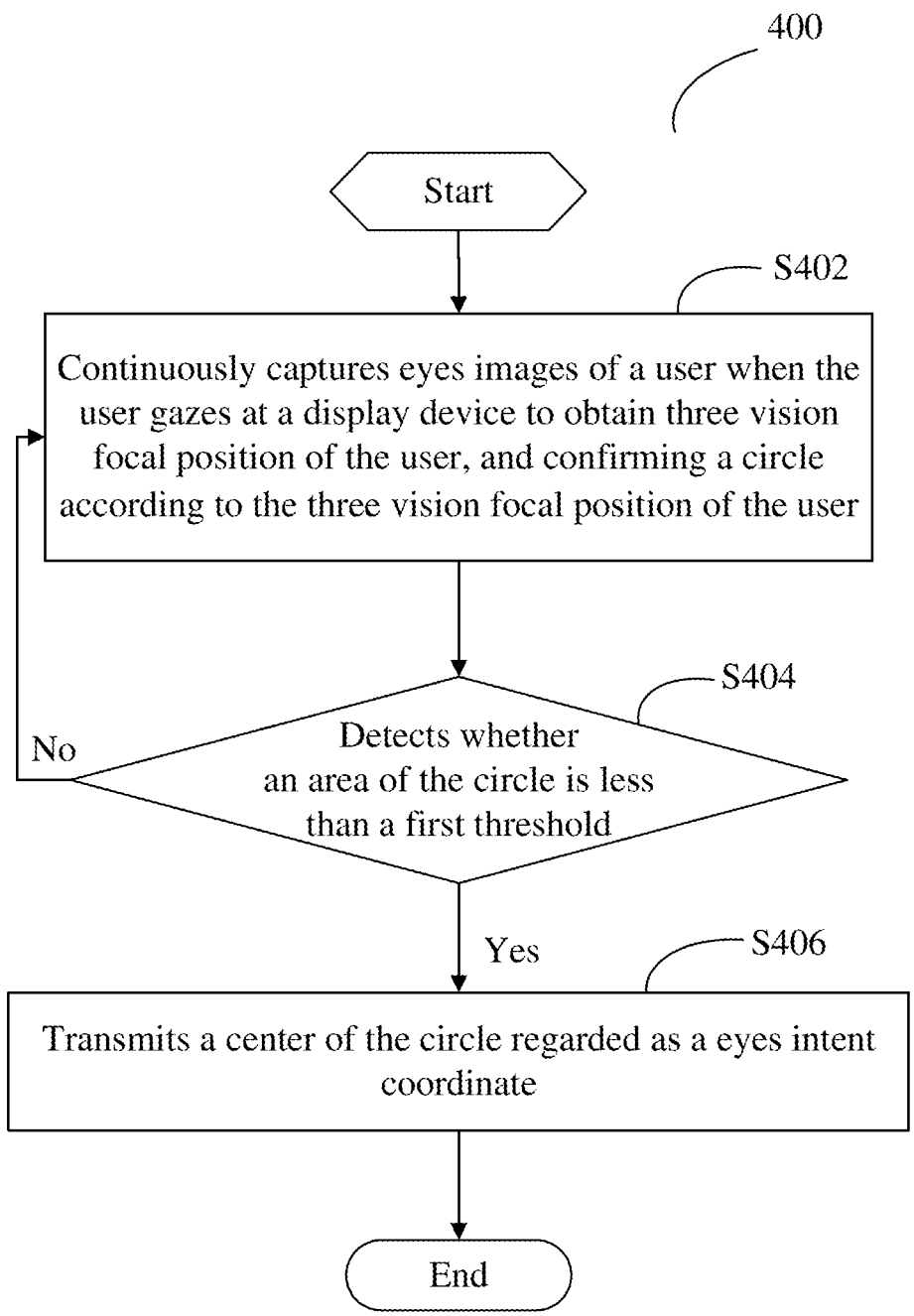
FIG. 4 is a flowchart of one embodiment of a method of the video terminal device output eye direction coordinate.

FIG. 4 is a flowchart of one embodiment of a method 400 of the video terminal device transmitting eye direction target coordinates. The method 400 is applied for the video terminal device 10, and achieved by the modules shown in FIG. 2.

In block S402, the capture module 210 continuously taking an images of eyes of a user when the user gazes at a display device to obtain three visual focal positions of the user, and confirming a circle according to the three visual focal positions of the user.

In block S404, the detection module 220 detects whether an area of the circle is less than a first threshold. If the area of the circle is less than the first threshold, the method 400 then proceeds to block S404, if the area of the circle is not less than the first threshold, the method 400 then proceeds to block S402.

In block S406, the transmitting module 230 outputs a centre of the circle as a eye direction coordinate. In another embodiment, the transmitting module 230 also can output the eye direction coordinate showing in the display device 30 or output the eye direction coordinate to other video terminal device.

When the area of the circle is not less than the first threshold, in block S402, the capture module 210 continuously obtains again three visual focal positions of the user to confirm a new circle until the area of the new circle is less than the first threshold.

Figure 5:
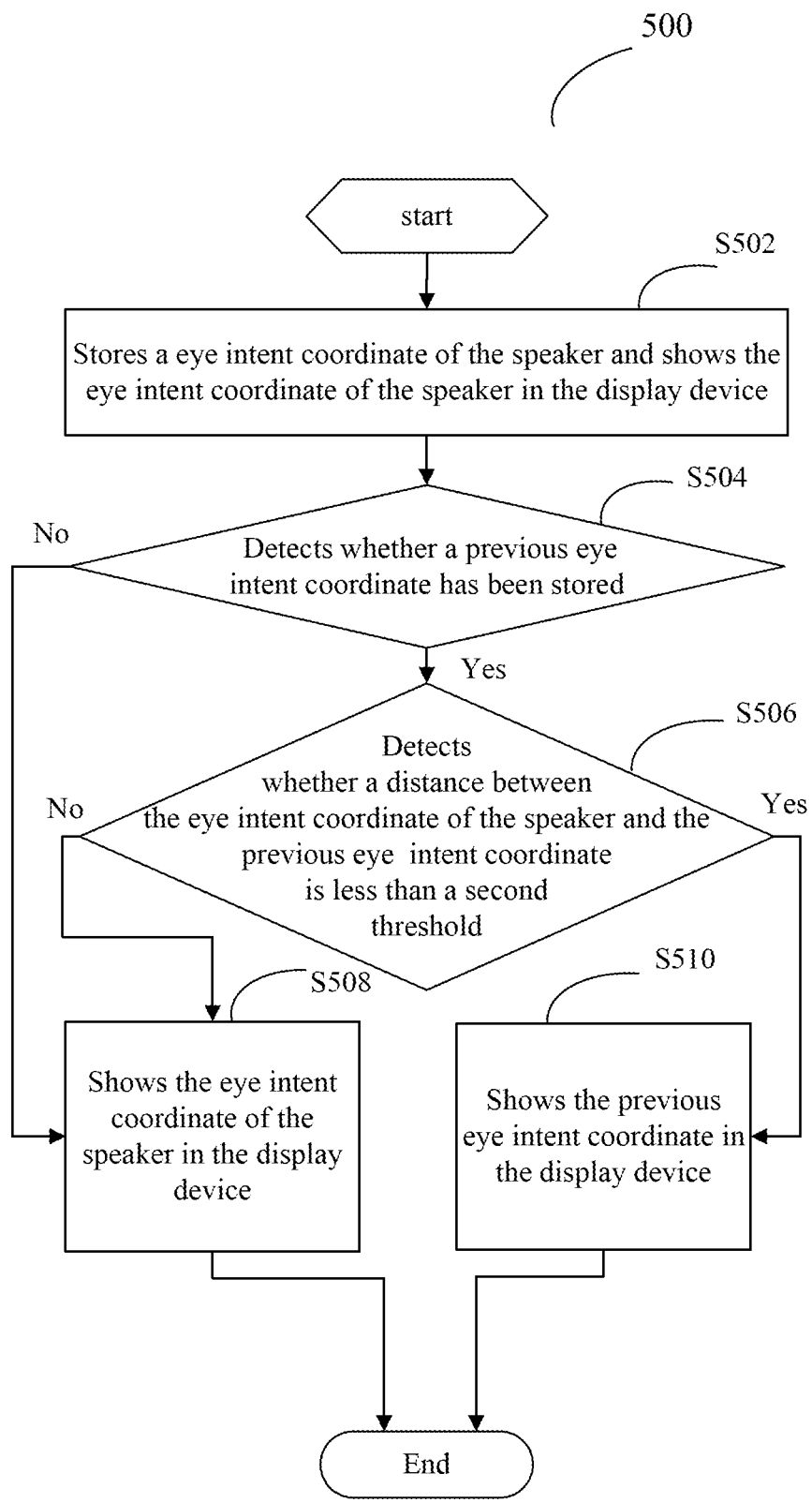
FIG. 5 is a flowchart of one embodiment of a method of the video terminal device used by listeners handling the eye direction coordinate of a speaker

FIG. 5 is a flowchart of one embodiment of a method 500 of the video terminal device 10 used by listeners handling the eye direction coordinates of the speaker. The method 500 is applied for the video terminal device, and achieved by the modules shown in FIG. 2. In different embodiment, the listeners and the speaker can separately use the video terminal device 10.

In block S502, the displaying module 240 stores the eye direction coordinate of the speaker and shows the eye direction coordinate of the speaker in the display device.

In block S504, the detection module 220 detects whether the storage system 250 has stored first previous eye direction coordinate. If not, then proceeds to block S508, otherwise proceeds to block S506.

In block S506, the detection module 220 detects whether a distance between the eye direction coordinate output by the transmitting module 230 and the first previous eye direction coordinate stored in the storage system is less than a second threshold. If not, the displaying module 210 updates the first previous eye direction coordinate to the eye direction coordinate, the method 500 then proceeds to block S508, otherwise the method 500 proceeds to block S510.

In block S508, the displaying module 240 shows the eye direction coordinate output by the transmitting module 230 in the display device 30.

In block S510, the displaying module 240 shows the second previous eye direction coordinate in the display device 30.

Figure 6:
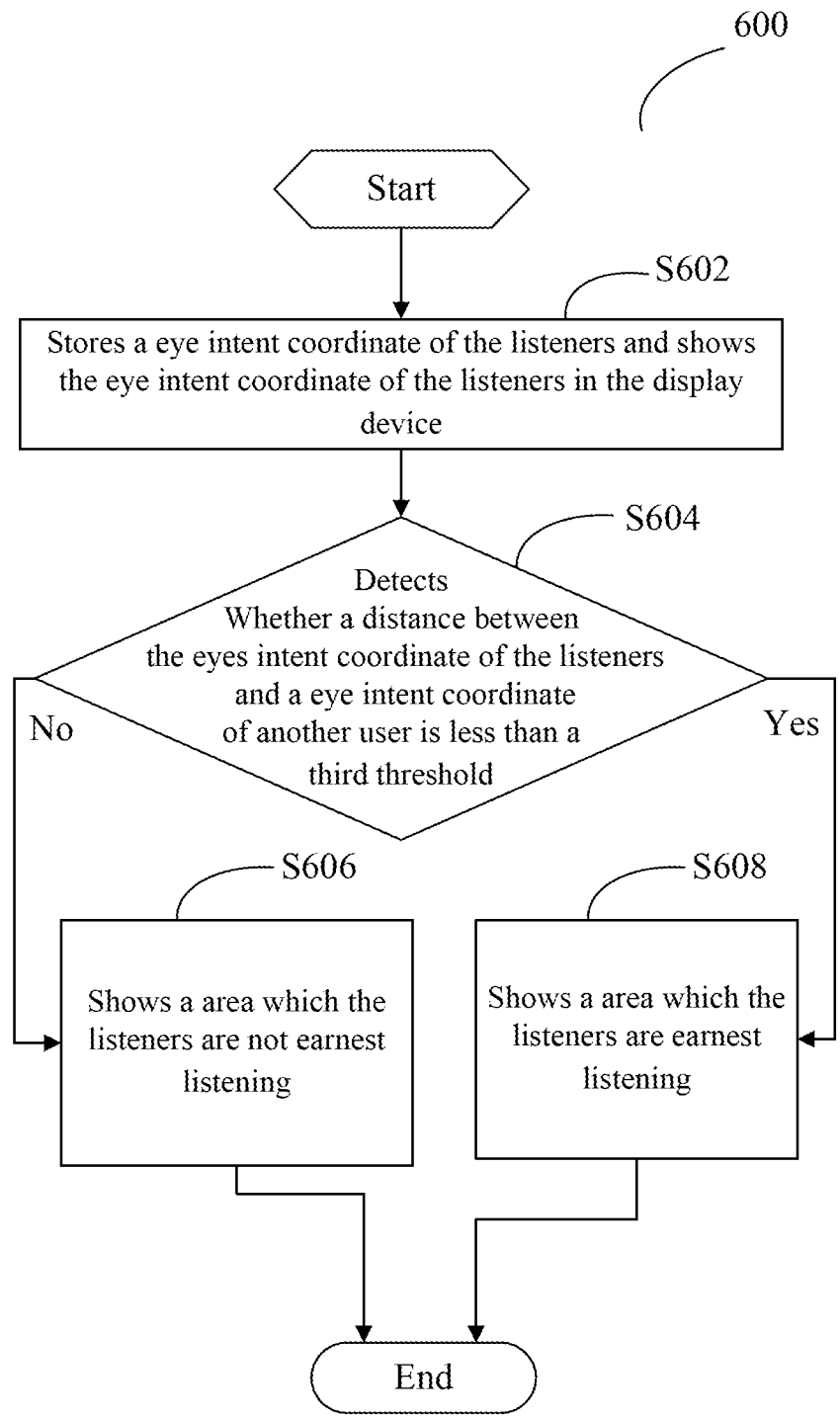
FIG. 6 is a flowchart of one embodiment of a method of the video terminal device used by the speaker handling the eye direction coordinate of the listeners

FIG. 6 is a flowchart of one embodiment of a method 600 of the video terminal device used by the speaker handling the eye direction coordinates of the listeners. The method 600 is applied for the video terminal device, and achieved by the modules shown in FIG. 2. In different embodiment, the listeners and the speaker can separately use the video terminal device 10.

In block S602, the displaying module 240 stores the eye direction coordinate of the listeners and shows the eye direction coordinate of the listeners in the display device.

In block S604, the detection module 220 detects whether the distance between the eye direction coordinate output by the transmitting module 230 and the eye direction coordinate of another user is less than a third threshold. Another user is the speaker. The If not, then the method 600 proceeds to block S606, otherwise the method 600 proceeds to block S608.

In block S606, the displaying module 240 shows a area which the listeners are not earnest listening.

In block S608, the displaying module 240 shows a area which listener are earnest listening.

The foregoing disclosure of the various embodiments has been presented for purposes of illustration and description. It is not intended to be exhaustive or to limit the present disclosure to the precise forms disclosed. Many variations and modifications of the embodiments described herein will be apparent to one of ordinary skill in the art in the light of the above disclosure. The scope of the present disclosure is to be defined only by the claims appended hereto and their equivalents.

What is claimed is:

1. A video terminal device comprising a processor and a storage system, the storage system storing one or more software programs in the form of computerized codes operable to be executed by the processor, the one or more software programs comprising:

a capture module, configured for continuously taking images of eyes of a user when the user gazes at a display device to obtain three visual focal positions of the user, and confirming a circle according to the three visual focal position of the user;

a detection module, configured for detecting whether an area of the circle is less than a first threshold; and a transmitting module, outputting a coordinate of a centre of the circle as an eye direction coordinate when the area of the circle is less than the first threshold;

wherein the first threshold area is a preset constant according to a speaker's preference.

2. The video terminal device of claim 1, wherein the capture module is further configured to continuously obtain again three new visual focal positions of the user to confirm a new circle when the area of the circle is not less than the first threshold.

3. The video terminal device of claim 2, further comprising:

a displaying module, configured for storing the eye direction coordinate output by the transmitting module in the storage system, and showing the eye direction coordinate in the display device.

4. The video terminal device of claim 3, wherein the detection module is further configured to detect whether the storage system has ever stored a previous eye direction coordinate, and the displaying module shows the eye direction coordinate output by the transmitting module as a newest eye direction coordinate in the display device when the storage system has not stored the previous eye direction coordinate.

5. The video terminal device of claim 4, wherein the detection module is further configured to detect whether a distance between the eye direction coordinate output by the transmitting module and the previous eye direction coordinate stored in the storage system is less than a second threshold when the storage system has stored the previous eye direction coordinate.

6. The video terminal device of claim 5, wherein the displaying module configured to update the previous eye direction coordinate to the eye direction coordinate output by the transmitting module when the distance between the eye direction coordinate output by the transmitting module and the previous eye direction coordinate stored in the storage system is not less than the second threshold.

7. The video terminal device of claim 5, wherein the displaying module is configured to not update the previous eye direction coordinate when the distance between the eye direction coordinate eye direction output by the transmitting module and the previous eye direction coordinate stored in the storage system is less than the second threshold.

8. The video terminal device of claim 3, wherein the detection module is further configured to detect whether a distance between the eye direction coordinate output by the transmitting module and a eye direction coordinate of another user is less than a third threshold.

9. The video terminal device of claim 8, wherein the displaying module is further configured to show an area which listener are earnest listening when the distance between the eye direction coordinate output by the transmitting module and the eye direction coordinate of another user is less than the third threshold.

10. The video terminal device of claim 8, wherein the displaying module is further configured to show an area which listener are not earnest listening when the distance between the eye direction coordinate output by the transmitting module and the eye direction coordinate of another user is not less than the third threshold.

11. An eye direction detecting method of a video terminal device, the method comprising:

continuously taking images of eyes of a user when the user gazes at a display device to obtain three visual focal positions of the user, and confirming a circle according to the three visual focal positions of the user;

detecting whether area of the circle is less than a first threshold; and outputting a coordinate of a centre of the circle as an eye direction coordinate when the area of the circle is less than the first threshold;

wherein the first threshold area is a preset constant according to a speaker's preference.

12. The eye direction detecting method of a video terminal device of claim 11, further comprising:
   continuously obtaining again three new visual focal positions of the user to confirm a new circle when the area of the circle is not less than the first threshold.

13. The eye direction detecting method of a video terminal device of claim 12, further comprising:
   detecting whether a previous eye direction coordinate has been stored ever;
   showing the eye direction coordinate as a newest eye direction coordinate in the display device when the previous eye direction coordinate has not been stored;
   detecting whether a distance between the eye direction coordinate and the previous eye direction coordinate is less than a second threshold when the previous eye direction coordinate has been stored;
   updating the previous eye direction coordinate to the eye direction coordinate and showing the eye direction coordinate as the newest eye direction coordinate in the display device when the distance between the eye direction coordinate and the previous eye direction coordinate is not less than the second threshold; and
   showing the previous eye direction coordinate in the display device when the distance between the eye direction coordinate and the previous eye direction coordinate is less than the second threshold.

14. The eye direction detecting method of a video terminal device of claim 12, further comprising
   detecting whether the distance between the eye direction coordinate and a eye direction coordinate of another user is less than a third threshold;
   showing an area which at least one listener is earnestly listening when the distance between the eye direction coordinate and the eye direction coordinate of another user is less than the third threshold; and
   showing an area in which at least one listener is not earnestly listening when the distance between the eye direction coordinate and the eye direction coordinate of another user is not less than the third threshold.

15. A video terminal device comprising a processor and a storage system, the storage system storing one or more software programs in the form of computerized codes operable to be executed by the processor, the one or more software programs comprising:
   a capture module, configured for continuously taking images of eyes of a user when the user gazes at a display device to obtain three visual focal positions of the user, and confirming a circle according to the three visual focal position of the user;
   a detection module, configured for detecting whether an area of the circle is less than a first threshold; and
   a transmitting module, outputting a coordinate of a centre of the circle as an eye direction coordinate when the area of the circle is less than the first threshold;
   wherein the first threshold area is a preset constant according to a speaker's preference, and
   the detection module is further configured to detect whether a distance between the eye direction coordinate output by the transmitting module and a eye direction coordinate of another user is less than a second threshold.

16. The video terminal device of claim 15, further comprising:
   a displaying module, configured for storing the eye direction coordinate output by the transmitting module in the storage system, and showing the eye direction coordinate in the display device.

17. The video terminal device of claim 16, wherein the displaying module is further configured to show an area which listener are earnest listening when the distance between the eye direction coordinate output by the transmitting module and the eye direction coordinate of another user is less than the second threshold.

18. The video terminal device of claim 16, wherein the displaying module is further configured to show an area which listener are not earnest listening when the distance between the eye direction coordinate output by the transmitting module and the eye direction coordinate of another user is not less than the second threshold.

* * * * *